W. B. C. HERSHEY.
DETACHABLE FLOOR FOR VEHICLE BODIES.
APPLICATION FILED DEC. 10, 1908.

940,154.

Patented Nov. 16, 1909.

Witnesses
Carl Stoughton
A. L. Phelps

Inventor
William B. C. Hershey
By C. O. Shepherd,
Attorney

UNITED STATES PATENT OFFICE.

WILLIAM B. C. HERSHEY, OF COLUMBUS, OHIO.

DETACHABLE FLOOR FOR VEHICLE-BODIES.

940,154.     Specification of Letters Patent.     Patented Nov. 16, 1909.

Application filed December 10, 1908. Serial No. 466,774.

*To all whom it may concern:*

Be it known that I, WILLIAM B. C. HERSHEY, a citizen of the United States, residing at Columbus, in the county of Franklin and State of Ohio, have invented certain new and useful Improvements in Detachable Floors for Vehicle-Bodies, of which the following is a specification.

Figure 1:
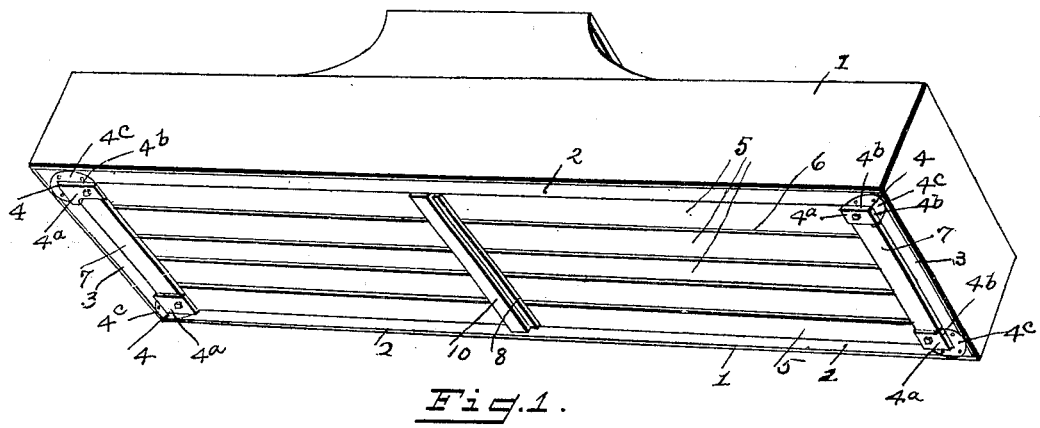
Figure 2:
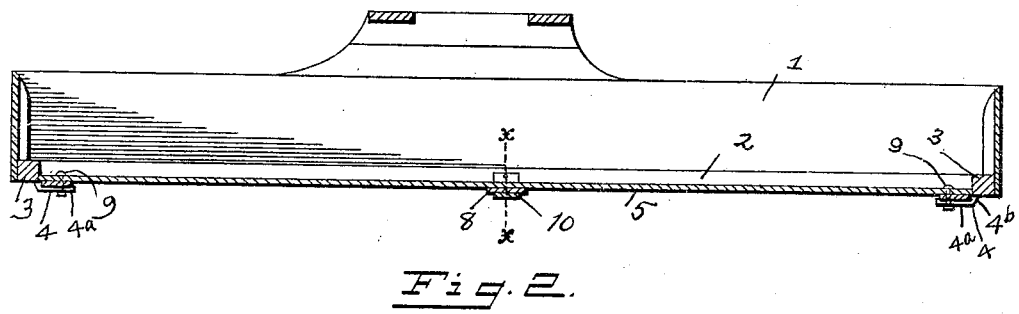
Figure 3:
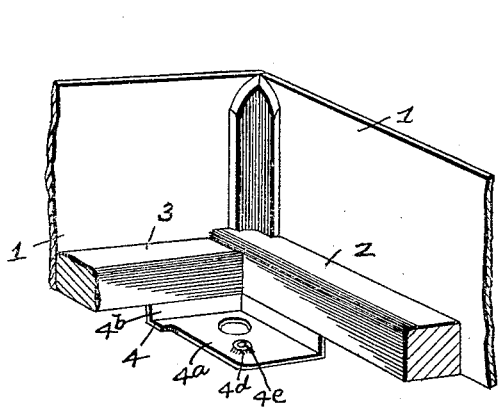
Figure 4:
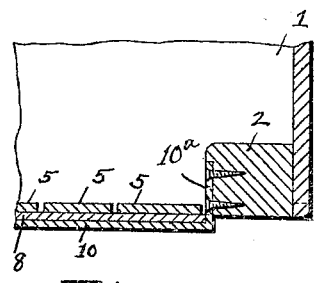

My invention relates to floors for vehicle bodies, and the objects of my invention are to provide an improved construction and arrangement of vehicle body floors, which will permit of the floor being detachably supported in its proper relation to the body; to so support my improved detachable floor and its support as to insure the provision of a strong and durable bottom for vehicle bodies, which may be readily removed therefrom or inserted therein. These objects I accomplish in the manner illustrated in the accompanying drawing, in which:

Figure 1 is a view in perspective of a vehicle body having my improved floor therein, Fig. 2 is a central longitudinal section of the same, Fig. 3 is a detail view in perspective of the inner corner of the vehicle body, showing one of the floor supporting brackets connected therewith, and, Fig. 4 is an enlarged sectional view on line $x$—$x$ of Fig. 2.

Similar numerals refer to similar parts throughout the several views.

1 represents a vehicle body, 2 the longer side sills which are arranged at the base of the body in the usual manner and 3 the end sills.

4 represents corner connecting and floor supporting brackets, which are of the character shown in my former application for patent Serial Number 438,475, filed June 15th, 1908. Each of these brackets is in the nature of a horizontal supporting plate $4^a$ from one end and inner side of which rise and project adjoining flanges $4^b$ the upper portions of which terminate in a horizontal lip member $4^c$. This lip projection $4^c$ is adapted, as shown, to be secured to the undersides of the adjoining ends of the side and end sills of the vehicle body, thus permitting the depressed supporting plate member $4^a$ to extend in the direction of the length of the body on a lower plane than the bottoms of the sills. Each of the members $4^a$ has formed therewith toward its outer corner, an upwardly projecting boss $4^d$ and through said boss and plate, is formed a vertical bolt hole $4^e$.

In carrying out my invention, I employ a separately formed vehicle body floor or bottom which comprises a plurality of parallel longitudinally arranged floor boards 5 which are separated by narrow longitudinal spaces 6 and which at each end are connected on their undersides by a transverse bar or cleat 7. I also connect the undersides of the boards 5 at the centers of their lengths or at other desirable points by a transverse cleat or board, such as is indicated at 8.

As indicated in the drawing, the ends of the end cleats 7 are adapted to be supported upon the plate members $4^a$ of the brackets 4, in which position they are detachably secured by means of bolts 9 which pass through the bolt holes $4^e$. To further support the floor in proper relation to the body, I provide a U-shaped supporting bar 10 the upturned ends of which as indicated at $10^a$ are secured to the inner faces of the central portions of the side sills 2, the lower horizontal portion of the supporting bar being on a line with the supporting upper faces of the corner bracket plates $4^a$. As shown in the drawing, the central cleat or board 8 of the floor, bears upon the bar 10. It is obvious, however, that more than one of the supporting members 10 might be employed between the side sills to provide additional supports for the vehicle bottom, if desired.

From the construction which I have shown and described, it will be readily understood that the floor may be formed after the manner described independently of the body and inserted in place therein when desired, said floor being adapted to be detachably secured in its position by means of the bolts 9. This method of providing a separately formed floor and means for detachably connecting the same with the vehicle body, is found to be exceedingly convenient in the finishing or painting of the body and in washing the floor when in a detached condition.

It will be observed that the means which I employ for supporting the floor at its corners and intermediate of its length, are such as to insure firm bearings therefor, which will resist comparatively heavy pressure or weight and which will at the same time, admit of the production of a floor of comparatively light construction.

Although the floor boards are shown arranged longitudinally or lengthwise of the vehicle body with cross cleats connecting the same as described, it is obvious that without affecting the spirit of my invention, said floor boards might be arranged transversely of the vehicle body and longitudinal connecting cleats employed instead of transverse cleats.

What I claim, is:

In a detachable vehicle body floor and supports therefor, the combination with the vehicle body, its side and end sills, and corner brackets each of which comprises a member secured to the undersides of the adjoining ends of a side and end sill and further comprises a depressed integrally formed floor supporting member, of a fixed bar extending transversely between the side sills, and a floor for the vehicle body adapted to be detachably supported upon the depressed members of said corner brackets and upon said transverse bar.

In testimony whereof I affix my signature in presence of two witnesses.

WILLIAM B. C. HERSHEY.

Witnesses:
L. CARL STOUGHTON,
A. L. PHELPS.